United States Patent
Eklund et al.

(10) Patent No.: US 11,713,083 B2
(45) Date of Patent: Aug. 1, 2023

(54) SUBFRAME ASSEMBLY FOR A VEHICLE UTILIZING SCALEABLE MULTI-CELL EXTRUDED SIDERAIL MEMBERS

(71) Applicant: Volvo Car Corporation, Gothenburg (SE)

(72) Inventors: Johan Eklund, Gothenburg (SE); Anders Sandahl, Gothenburg (SE); Jens Raine, Gothenburg (SE); Domenico Macri, Gothenburg (SE); Emil Claesson, Gothenburg (SE); Per Zachrison, Gothenburg (SE); Kaldon Kalasho, Gothenburg (SE); Robin Larsson, Gothenburg (SE); Martin Granlund, Gothenburg (SE); Patrik Ljungbäck, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/356,848

(22) Filed: Jun. 24, 2021

(65) Prior Publication Data
US 2022/0410975 A1    Dec. 29, 2022

(51) Int. Cl.
*B62D 21/15*    (2006.01)
*B62D 29/00*    (2006.01)
*B62D 21/11*    (2006.01)

(52) U.S. Cl.
CPC ............ *B62D 21/155* (2013.01); *B62D 21/11* (2013.01); *B62D 29/008* (2013.01)

(58) Field of Classification Search
CPC ...... B62D 21/11; B62D 21/15; B62D 21/152; B62D 21/155; B62D 29/008
See application file for complete search history.

(56) References Cited

U.S. PATENT DOCUMENTS

| 5,496,067 A * | 3/1996 | Stoll | B62D 21/07 |
| | | | 280/783 |
| 6,258,465 B1 * | 7/2001 | Oka | B62D 21/157 |
| | | | 428/598 |
| 6,382,709 B1 * | 5/2002 | Chirifu | B62D 29/008 |
| | | | 276/29 |
| 6,811,212 B2 * | 11/2004 | Kasuga | F16F 7/12 |
| | | | 296/203.02 |

(Continued)

*Primary Examiner* — Laura Freedman
(74) *Attorney, Agent, or Firm* — Clements Bernard Walker; Christopher L. Bernard

(57) ABSTRACT

A siderail member for a subframe assembly of a vehicle, including: an elongate body, wherein the elongate body includes a hollow extruded structure including an inboard wall, an outboard wall, a top wall, a bottom wall, and one or more internal walls. Optionally, the bottom wall has a thickness that is greater than a thickness of the top wall. Optionally, the outboard wall has a thickness that is greater than a thickness of the inboard wall. Optionally, the one or more internal walls include a top internal wall and a bottom internal wall forming a plurality of horizontally-disposed cells within an interior of the elongate body. The bottom internal wall has a thickness that is greater than a thickness of the top internal wall. The hollow extruded structure is manufactured from an aluminum material. Optionally, the top wall of the hollow extruded structure defines a flexure recess.

21 Claims, 13 Drawing Sheets

(56) References Cited

U.S. PATENT DOCUMENTS

| | | | | |
|---|---|---|---|---|
| 6,893,078 B2* | 5/2005 | Saeki | .................... | B62D 21/152 |
| | | | | 296/203.02 |
| 7,063,376 B2* | 6/2006 | Ori | ....................... | B62D 29/007 |
| | | | | 296/29 |
| 7,614,658 B2* | 11/2009 | Yamada | ............... | B62D 21/152 |
| | | | | 296/203.02 |
| 9,352,783 B2* | 5/2016 | Winberg | ............. | B62D 29/008 |
| 9,725,122 B2* | 8/2017 | Kim | .................... | B62D 25/082 |
| 10,071,771 B2* | 9/2018 | Maier | .................. | B62D 25/085 |
| 10,246,133 B2* | 4/2019 | Cha | ...................... | B62D 21/152 |
| 10,330,168 B2* | 6/2019 | Tyan | .................... | B62D 21/15 |
| 10,640,154 B2* | 5/2020 | Takii | ..................... | B62D 65/02 |
| 10,864,871 B2* | 12/2020 | Tashiro | .................... | F16F 7/12 |
| 10,940,891 B2* | 3/2021 | Eklund | ................. | B21C 23/142 |
| 10,967,906 B1* | 4/2021 | Butukuri | ............. | B62D 21/152 |
| 11,247,726 B2* | 2/2022 | Eklund | .................... | B60G 7/02 |
| 11,603,137 B2* | 3/2023 | Eklund | ............... | B62D 21/155 |
| 2004/0119321 A1* | 6/2004 | Kasuga | ............... | B62D 21/152 |
| | | | | 296/205 |
| 2015/0003904 A1* | 1/2015 | Saje | ........................ | B60R 19/24 |
| | | | | 403/361 |
| 2016/0068193 A1* | 3/2016 | Koike | ............... | B62D 25/2045 |
| | | | | 296/187.09 |
| 2019/0351947 A1* | 11/2019 | Eklund | ............... | B62D 27/023 |
| 2021/0291904 A1* | 9/2021 | Eklund | .................. | B62D 21/03 |
| 2021/0339693 A1* | 11/2021 | Urushibata | .......... | B62D 29/004 |

* cited by examiner

SUBFRAME ASSEMBLY FOR A VEHICLE UTILIZING SCALEABLE MULTI-CELL EXTRUDED SIDERAIL MEMBERS

TECHNICAL FIELD

The present disclosure relates generally to the automotive field. More particularly, the present disclosure relates to a subframe assembly for a vehicle utilizing scaleable multi-cell extruded siderail members that provide robust crash energy absorbance.

BACKGROUND

In most conventional vehicles, a subframe assembly is provided and supports the engine/motor mounts, steering components, and suspension components. This subframe assembly is largely responsible for providing front-end crash energy absorbance, preferably plastically deforming, crumpling, and bending down to avoid the stackup and occupant cabin intrusion of components. Thus, the subframe assembly is configured to provide a lower load path (LLP) to transfer crash energy from the LLP crash management system (CMS) beam and crashboxes or the like to the battery frame or the like, with the upper load path (ULP) being the body in white (BIW). Most such subframe assemblies utilize, in part, a pair of laterally disposed siderail members for this purpose. However, such siderail members typically do not provide a substantially uninterrupted LLP between the LLP CMS beam and crashboxes and the ULP BIW and/or battery frame, thereby limiting crash energy absorbance capability. Further, such siderail members, and subframe assemblies in general, may be heavy, difficult to manufacture, and configuration constrained by the associated cooling package, engine/motor mounts, steering components, and/or suspension components. Still further, such siderail members typically lack sufficient rigidity with adequate ductility such that the siderails members can absorb high crash energy without cracking and fracturing, potentially allowing the stackup and occupant cabin intrusion of components.

This background is provided as non-limiting environmental context only. It will be readily apparent to those of ordinary skill in the art that the concepts of the present disclosure may be applied in other environmental contexts equally. For example, the front-end vehicle concepts provided herein may be utilized in rear-end vehicle applications as well.

SUMMARY

The present disclosure provides a subframe assembly for a vehicle utilizing straight, parallel extruded longitudinal siderail members. This subframe assembly provides front-end (or rear-end) crash energy absorbance by plastically deforming, crumpling, and bending down to avoid the stackup and occupant cabin intrusion of components, such as the attached engine/motor, engine/motor mounts, steering components, and suspension components. The laterally disposed longitudinal siderail members each provide a straight, substantially uninterrupted LLP to transfer crash energy from the LLP CMS beam and crashboxes or the like to a rear bracket coupled to the ULP BIW or the like, and ultimately to the battery frame, with the siderail members and crashboxes optionally being longitudinally coaxially aligned. Each of the siderail members may be separated from the battery frame itself by a small longitudinal clearance that is rapidly absorbed in a crash. Each of the siderail members may also be coupled to a front bracket coupled to the ULP BIW or the like. The siderail members, and subframe assembly in general, may be manufactured from extruded aluminum or the like, resulting in significant weight savings. This configuration is flexible and can readily accommodate different cooling package, engine/motor mount, steering component, and/or suspension component arrangements with minimal modification.

The present disclosure also provides a subframe assembly for a vehicle utilizing scaleable multi-cell extruded siderail members that provide robust crash energy absorbance, providing superior rigidity with significant ductility such that the siderails members can absorb high crash energy without cracking and fracturing, preventing the stackup and occupant cabin intrusion of components.

In one illustrative embodiment, the present disclosure provides a subframe assembly for a vehicle, the subframe assembly including: a pair of parallel siderail members, wherein each of the pair of parallel siderail members is straight from a top or bottom vehicle perspective and spans a distance between a lower load path crash management system of the vehicle and a rear upper load path body in white bracket and/or battery frame of the vehicle in a substantially uninterrupted manner. Each of the siderail members may be separated from the battery frame itself by a small longitudinal clearance that is rapidly absorbed in a crash. Each of the siderail members may also be coupled to a front bracket coupled to the upper load path body in white. Each of the pair of parallel siderail members is coaxially aligned with an associated crashbox of the lower load path crash management system from the top or bottom vehicle perspective. The lower load path crash management system further includes a lower load path beam coupled to the crashbox associated with each of the pair of parallel siderail members. Optionally, each of the pair of parallel siderail members includes a first portion that is disposed above a second portion from a side vehicle perspective. Each of the pair of parallel siderail members includes a top surface including one or more recessed trigger regions adapted to promote a downward bend of each of the parallel siderail members when a crash load is applied along a longitudinal axis of each of the parallel siderail members. Each of the pair of parallel siderail members is manufactured from extruded aluminum. Optionally, each of the pair of parallel siderail members includes one or more internal walls that define a plurality of internal cells of each of the pair of parallel siderail members. The subframe assembly further includes one or more crossmembers coupled between the pair of parallel siderail members. The subframe assembly further includes one or more component mounts coupled to each of the pair of parallel siderail members.

In another illustrative embodiment, the present disclosure provides a longitudinal siderail member for a subframe assembly of a vehicle, the longitudinal siderail member including: an extruded aluminum body, wherein the extruded aluminum body is straight from a top or bottom vehicle perspective and is adapted to span a distance between a lower load path crash management system of the vehicle and a rear upper load path body in white bracket and/or battery frame of the vehicle in a substantially uninterrupted manner. Each of the siderail members may be separated from the battery frame itself by a small longitudinal clearance that is rapidly absorbed in a crash. Each of the siderail members may also be coupled to a front bracket coupled to the upper load path body in white. The extruded aluminum body is adapted to be coaxially aligned with an associated crashbox of the lower load path crash management system from the top or bottom vehicle perspective. The lower load path crash management system further includes a lower load path beam coupled to the crashbox associated with the extruded aluminum body. Optionally, the extruded aluminum body includes a first portion that is disposed above a second portion from a side vehicle perspective. The extruded aluminum body includes a top surface including one or more recessed trigger regions adapted to promote a downward bend of the extruded aluminum body when a crash load is applied along a longitudinal axis of the extruded aluminum body. Optionally, the extruded aluminum body includes one or more internal walls that define a plurality of internal cells of the extruded aluminum body. The extruded aluminum body is adapted to be coupled to one or more crossmembers of the subframe assembly. The extruded aluminum body is adapted to be coupled to one or more component mounts of the subframe assembly.

In a further illustrative embodiment, the present disclosure provides a method for manufacturing a vehicle, the method including: providing a subframe assembly adapted to absorb crash energy, wherein the subframe assembly includes a pair of parallel siderail members, wherein each of the pair of parallel siderail members is straight from a top or bottom vehicle perspective and spans a distance between a lower load path crash management system of the vehicle and a rear upper load path body in white bracket, and ultimately a battery frame, of the vehicle in a substantially uninterrupted manner; coupling a first end of each of the pair of parallel siderail members to the lower load path crash management system; and coupling a second end of each of the pair of parallel siderail members to the rear upper load path body in white bracket. Each of the siderail members may be separated from the battery frame itself by a small longitudinal clearance that is rapidly absorbed in a crash. Each of the siderail members may also be coupled to a front bracket coupled to the upper load path body in white. Each of the pair of parallel siderail members thus defines a straight, substantially uninterrupted lower load path from the top or bottom vehicle perspective that is parallel to a longitudinal axis of the vehicle between the lower load path crash management system and the rear upper load path body in white bracket and/or battery frame. Coupling the first end of each of the pair of parallel siderail members to the lower load path crash management system includes coupling the first end of each of the pair of parallel siderail members to an associated longitudinally coaxially aligned crashbox of the lower load path crash management system.

In a still further exemplary embodiment, the present disclosure provides a subframe assembly for a vehicle, the subframe assembly including: a siderail member including an elongate body, wherein the elongate body includes a hollow extruded structure including an inboard wall, an outboard wall, a top wall, a bottom wall, and one or more internal walls. Optionally, the bottom wall has a thickness that is greater than a thickness of the top wall. Optionally, the outboard wall has a thickness that is greater than a thickness of the inboard wall. Optionally, the one or more internal walls include one or more horizontally-disposed internal walls that span a distance between the inboard wall and the outboard wall forming a plurality of horizontally-disposed hollow cells within an interior of the elongate body. Optionally, the one or more internal walls include one or more vertically-disposed internal walls that span a distance between the bottom wall and the top wall forming a plurality of vertically-disposed hollow cells within an interior of the elongate body. Optionally, the one or more internal walls include a top internal wall and a bottom internal wall forming a plurality of horizontally-disposed cells within an interior of the elongate body. The bottom internal wall has a thickness that is greater than a thickness of the top internal wall. The hollow extruded structure is manufactured from an aluminum material. Optionally, the top wall of the hollow extruded structure defines a flexure recess.

In a still further exemplary embodiment, the present disclosure provides a siderail member for a subframe assembly of a vehicle, the siderail member including: an elongate body, wherein the elongate body includes a hollow extruded structure including an inboard wall, an outboard wall, a top wall, a bottom wall, and one or more internal walls. Optionally, the bottom wall has a thickness that is greater than a thickness of the top wall. Optionally, the outboard wall has a thickness that is greater than a thickness of the inboard wall. Optionally, the one or more internal walls include one or more horizontally-disposed internal walls that span a distance between the inboard wall and the outboard wall forming a plurality of horizontally-disposed hollow cells within an interior of the elongate body. Optionally, the one or more internal walls include one or more vertically-disposed internal walls that span a distance between the bottom wall and the top wall forming a plurality of vertically-disposed hollow cells within an interior of the elongate body. Optionally, the one or more internal walls include a top internal wall and a bottom internal wall forming a plurality of horizontally-disposed cells within an interior of the elongate body. The bottom internal wall has a thickness that is greater than a thickness of the top internal wall. The hollow extruded structure is manufactured from an aluminum material. Optionally, the top wall of the hollow extruded structure defines a flexure recess.

In a still further exemplary embodiment, the present disclosure provides a method for manufacturing a siderail member for a subframe assembly of a vehicle, the method including: extruding an elongate body, wherein the elongate body includes a hollow structure including an inboard wall, an outboard wall, a top wall, a bottom wall, and one or more internal walls, and wherein the hollow structure is manufactured from an aluminum material. Optionally, the bottom wall has a thickness that is greater than a thickness of the top wall and the outboard wall has a thickness that is greater than a thickness of the inboard wall. Optionally, the one or more internal walls include a top internal wall and a bottom internal wall forming a plurality of horizontally-disposed cells within an interior of the elongate body, and the bottom internal wall has a thickness that is greater than a thickness of the top internal wall.

BRIEF DESCRIPTION OF THE DRAWINGS

The present disclosure is illustrated and described with reference to the various drawings, in which like reference numbers are used to denote like assembly components/method steps, as appropriate, and in which.

DETAILED DESCRIPTION

Again, the present disclosure provides a subframe assembly for a vehicle utilizing straight, parallel extruded longitudinal siderail members. This subframe assembly provides front-end (or rear-end) crash energy absorbance by plastically deforming, crumpling, and bending down to avoid the stackup and occupant cabin intrusion of components, such as the attached engine/motor, engine/motor mounts, steering components, and suspension components. The laterally disposed longitudinal siderail members each provide a straight, substantially uninterrupted LLP to transfer crash energy from the LLP CMS beam and crashboxes or the like to a rear bracket coupled to the ULP BIW or the like, and ultimately to the battery frame, with the siderail members and crashboxes optionally being longitudinally coaxially aligned. Each of the siderail members may be separated from the battery frame itself by a small longitudinal clearance that is rapidly absorbed in a crash. Each of the siderail members may also be coupled to a front bracket coupled to the ULP BIW or the like. The siderail members, and subframe assembly in general, may be manufactured from extruded aluminum or the like, resulting in significant weight savings. This configuration is flexible and can readily accommodate different cooling package, engine/motor mount, steering component, and/or suspension component arrangements with minimal modification.

The present disclosure also provides a subframe assembly for a vehicle utilizing scaleable multi-cell extruded siderail members that provide robust crash energy absorbance, providing superior rigidity with significant ductility such that the siderails members can absorb high crash energy without cracking and fracturing, preventing the stackup and occupant cabin intrusion of components.

Figure 1:
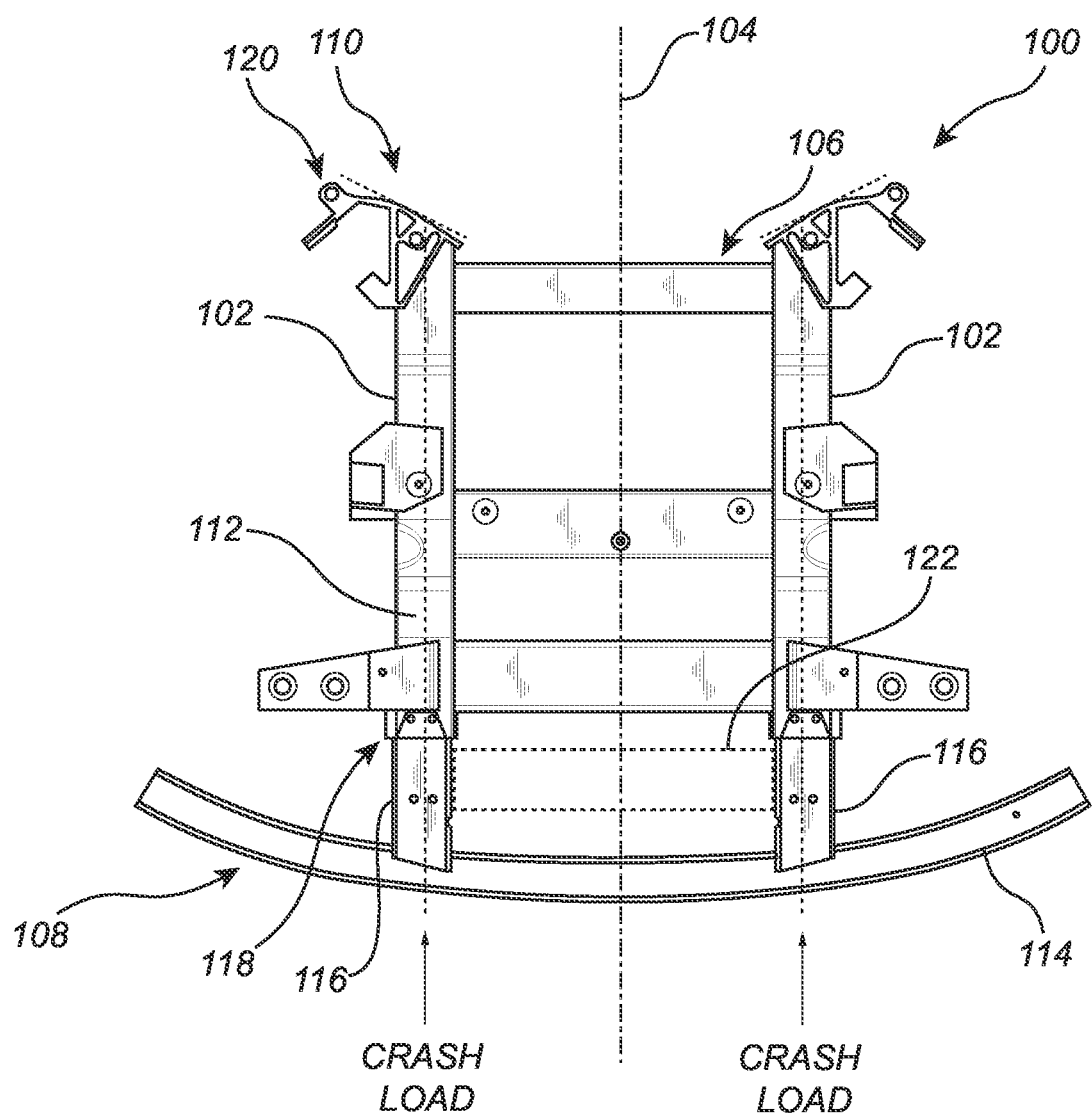
FIG. 1 is a top planar view of one illustrative embodiment of the subframe assembly and parallel, uninterrupted longitudinal siderail members of the present disclosure, highlighting the longitudinal coaxial alignment of the siderail members and the associated crashboxes.

Referring now specifically to FIG. 1, the subframe assembly 100 includes a pair of straight siderail members 102 that are each disposed parallel to a longitudinal axis 104 of the subframe assembly 100 and the associated vehicle and spaced apart laterally. These siderail members 102 are coupled together via a plurality of lateral crossmembers 106 that are disposed perpendicular to the longitudinal axis 104 between the siderail members 102. As is described in greater detail herein below, each of the siderail members 102 consists of a unitary, hollow aluminum extrusion, providing advantageous strength characteristics with minimal weight via a relatively simple manufacturing process that is flexible. Central to the present disclosure, the siderail members 102 substantially span the length of the subframe 100 from front to back, bridging the gap between the LLP CMS 108 and the rear ULP BIW coupling 120 and/or battery frame 110 of the vehicle. Because each of the siderail members 102 is straight (at least from a top or bottom vehicle perspective), this provides a substantially uninterrupted LLP 112 for high crash energy absorbance, from the LLP CMS 108, thru the siderail members 102, and into the rear ULP BIW coupling 120 and/or battery frame 110. Each of the siderail members 102 is substantially free from bends and/or intervening welds (at least from the top or bottom vehicle perspective) and is a straight, unitary extruded aluminum component. This provides a LLP 112 that has zero lateral offset, such that lever and torque forces are avoided in the event of a front-end (or rear-end) crash. It should be noted that any intervening welds would have less yield and the surrounding base material would include heat affected zones (HAZs), which may be 30-50% weaker. Further, it should be noted that, although the siderail members 102 substantially span the length of the subframe 100 from front to back and bridge the gap between the LLP CMS 108 and the rear ULP BIW coupling 120 and/or battery frame 110 of the vehicle, in actuality, each of the siderail members 102 may be connected to a rear ULP BIW bracket 124c (FIGS. 2, 3, 6, 7, 9, and 12), as is described in greater detail herein below, while a small longitudinal gap of 10-15 mm or so is left between the end of the siderail member 102 and the battery frame 110 itself. This small longitudinal gap is rapidly absorbed in a crash (in a few milliseconds) and allows either the subframe 100 or the battery frame 110 to be removed independently when necessary.

As illustrated, the LLP CMS includes a beam 114 and a pair of crashboxes 116 coupled between the beam 114 and the siderail members 102. Each of the pair of crashboxes 116 is coupled to the associated siderail member 102 via an appropriate bracket 118. Similarly, each of the siderail members 102 is coupled to the ULP BIW via an appropriate rear coupling 120 (which would be a front coupling 120 in a rear subframe setup). Again, a small longitudinal gap of 10-15 mm or so is left between the end of the siderail member 102 and the battery frame 110 itself, adjacent to the coupling 120. This is described in greater detail herein below. This small longitudinal gap is rapidly absorbed in a crash (in a few milliseconds) and allows either the subframe 100 or the battery frame 110 to be removed independently when necessary. Alternatively, an end of each of the pair of crashboxes 116 may be disposed and secured within a first end of the associated siderail member 102 via one or more sleeves and bolts or the like. The important aspect is that each crashbox 116 is axially aligned with the associated siderail member 102 (at least from the top or bottom vehicle perspective) and that the crashbox 116 and siderail member 102 are arranged substantially end to end. Again, this provides a LLP 112 that has zero lateral offset, such that lever and torque forces are avoided in the event of a front-end (or rear-end) crash, providing a substantially uninterrupted LLP 112 for high crash energy absorbance, from the beam 114 and crashboxes 116, thru the siderail members 102, and into the rear ULP BIW coupling 120 and/or battery frame 110. Symmetry about the longitudinal axis 104 is desired here (at least from the top or bottom vehicle perspective). The siderail members 102 are disposed equidistant from the longitudinal axis 104, as are the crashboxes 116, such that the crashboxes 116 and siderail members 102 are longitudinally coaxially aligned, as is illustrated.

This arrangement leaves room for the required vehicle cooling package 122, which is disposed either above the crashboxes 116 and LLP 112, or between the crashboxes 116 and LLP 112 and tilted. In the latter case, the cooling package 122 may be removed from below the vehicle.

Aluminum extrusions, such as those used herein, are possible using short, flexible manufacturing lines with relatively inexpensive tooling. Thus, variants of the components provided herein can be readily manufactured. For example, a rear wheel drive (RWD) version of the subframe 100 can be manufactured, with no front engine/motor, different suspension footprints can be accommodated (e.g., MacPherson, 4-link, or double wishbone with different linkarm and bushing brackets), different steering footprints can be accommodated, etc.

Figure 2:
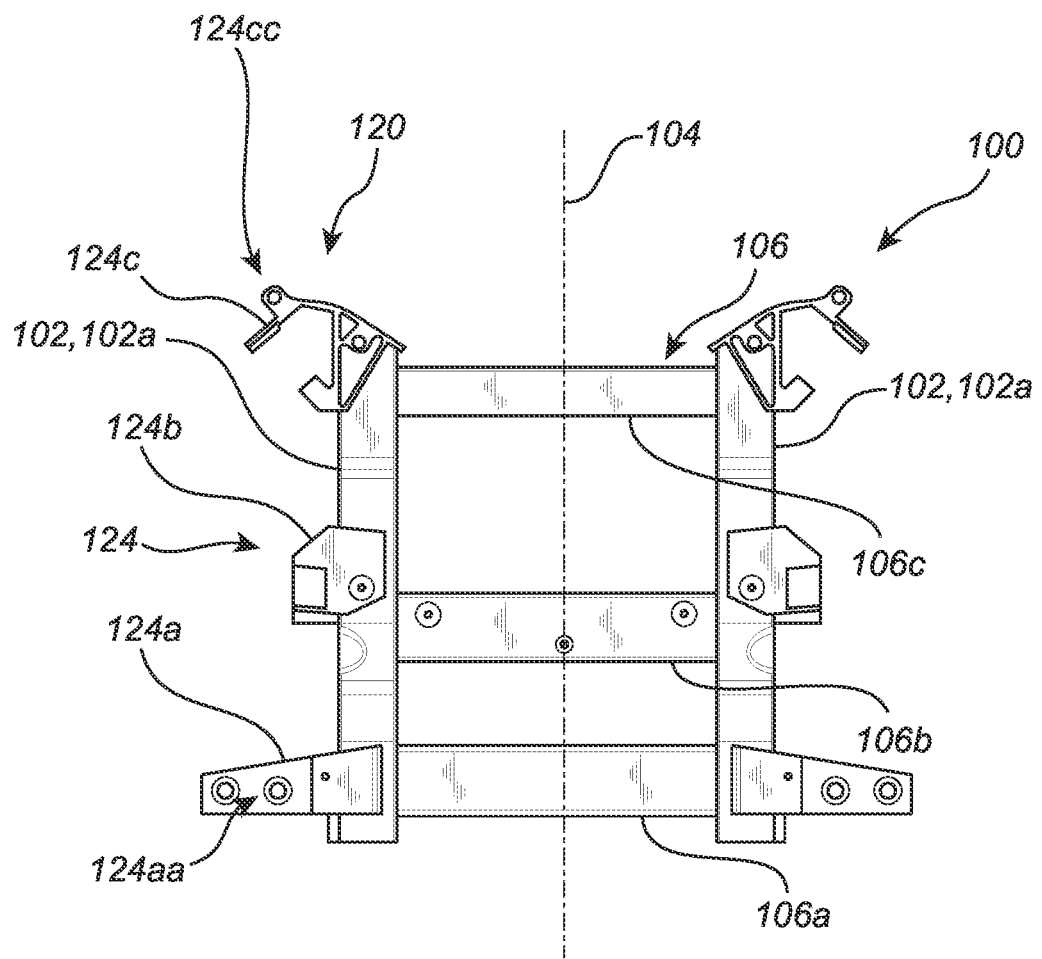
FIG. 2 is another top planar view of one illustrative embodiment of the subframe assembly and parallel, uninterrupted longitudinal siderail members of the present disclosure.

Referring now specifically to FIG. 2, from the top vehicle perspective, the subframe assembly 100 again includes the pair of straight siderail members 102 that are each disposed parallel to the longitudinal axis 104 of the subframe assembly 100 and the associated vehicle and spaced apart laterally. These siderail members 102 are coupled together via the plurality of lateral crossmembers 106 that are disposed perpendicular to the longitudinal axis 104 between the siderail members 102. Here, the crossmembers 106 include a center pole crossmember 106a, a steering gear crossmember 106b, and a rear crossmember 106c, although it will be readily apparent to those of ordinary skill in the art that other components could be used equally. Again, as is described in greater detail herein below, each of the siderail members 102 consists of a unitary, hollow aluminum extrusion, providing advantageous strength characteristics with minimal weight via a relatively simple manufacturing process that is flexible. Central to the present disclosure, the siderail members 102 substantially span the length of the subframe 100 from front to back, bridging the gap between the LLP CMS 108 (FIG. 1) and the rear ULP BIW coupling 120 and/or battery frame 110 (FIG. 1) of the vehicle. Because each of the siderail members 102 is straight (at least from a top or bottom vehicle perspective), this provides the substantially uninterrupted LLP 112 for high crash energy absorbance, from the LLP CMS 108, thru the siderail members 102, and into the rear ULP BIW coupling 120 and/or battery frame 110. Each of the siderail members 102 is substantially free from bends and/or intervening welds (at least from the top or bottom vehicle perspective) and is a straight, unitary extruded aluminum component. This provides the LLP 112 that has zero lateral offset, such that lever and torque forces are avoided in the event of a front-end (or rear-end) crash. It should be noted that any intervening welds would have less yield and the surrounding base material would include HAZs, which may be 30-50% weaker.

As illustrated, each of the siderail members 102 is coupled to the ULP BIW via the appropriate rear coupling 120. Here, the mounts 124 used to couple components to the siderail members 102 include an engine mount shelf bracket 124a that includes a front BIW interface 124aa, an engine mount sleeve and lower wishbone bracket 124b, and a lower wishbone bracket 124c that includes the rear BIW interface 124cc, although it will be readily apparent to those of ordinary skill in the art that other components could be used equally. Any arrangement of mounts 124 can be used to support the engine/motor, suspension, and steering components, and these mounts 124 are typically coupled symmetrically to the outboard side of each of the siderail members 102. Thus, the holes/fittings for receiving and retaining these mounts 124 can readily be arranged and rearranged given the extruded aluminum body 102a of the present disclosure. Of note here, a front BIW interface 124aa and a rear BIW interface 124cc are provided, which the straight longitudinal siderail member 102 spans.

Figure 3:
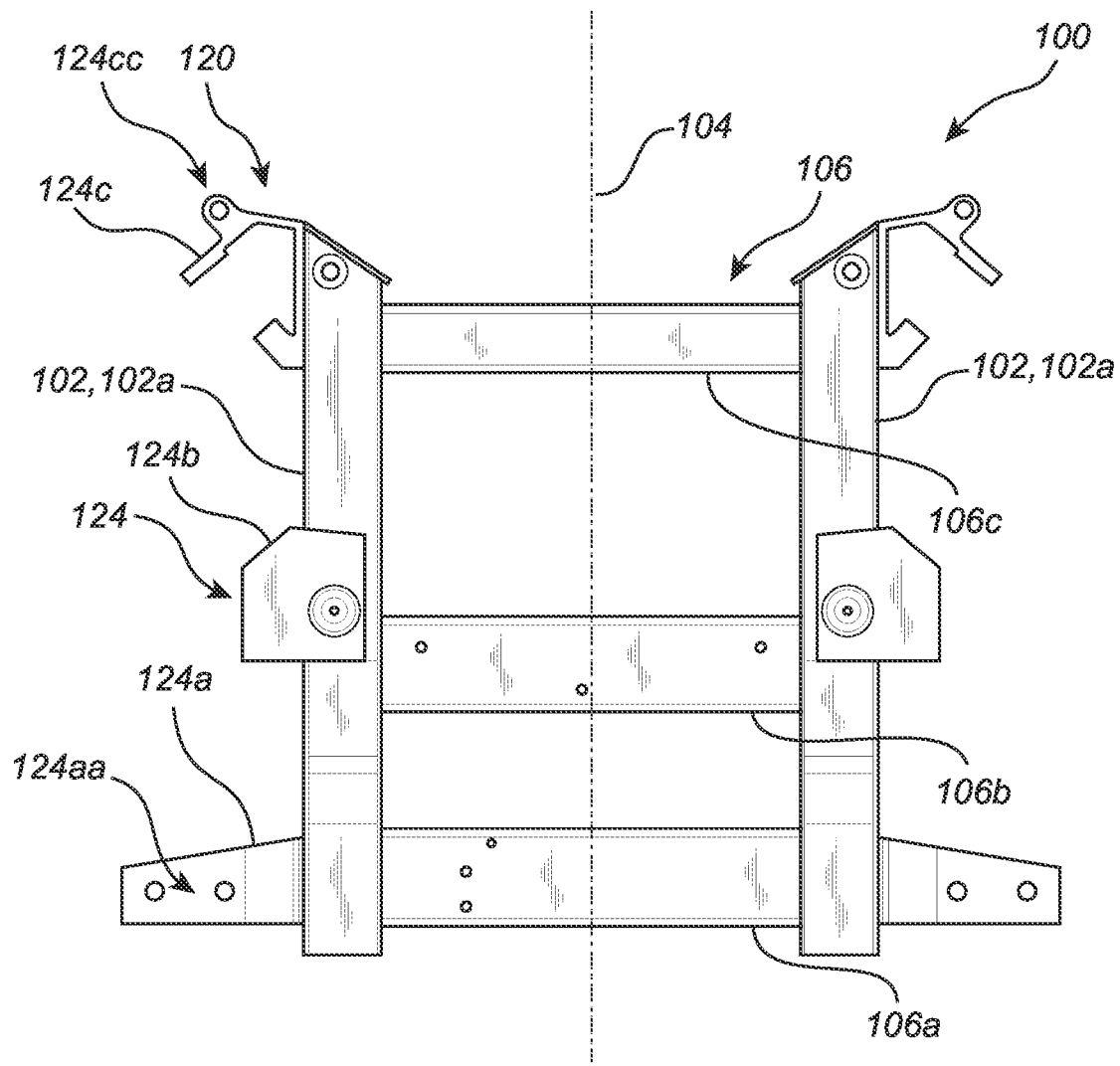
FIG. 3 is a bottom planar view of one illustrative embodiment of the subframe assembly and parallel, uninterrupted longitudinal siderail members of the present disclosure.

Referring now specifically to FIG. 3, from the bottom vehicle perspective, the subframe assembly 100 again includes the pair of straight siderail members 102 that are each disposed parallel to the longitudinal axis 104 of the subframe assembly 100 and the associated vehicle and spaced apart laterally. These siderail members 102 are coupled together via the plurality of lateral crossmembers 106 that are disposed perpendicular to the longitudinal axis 104 between the siderail members 102. Here, the crossmembers 106 include the center pole crossmember 106a, the steering gear crossmember 106b, and the rear crossmember 106c, although it will be readily apparent to those of ordinary skill in the art that other components could be used equally. Again, as is described in greater detail herein below, each of the siderail members 102 consists of a unitary, hollow aluminum extrusion, providing advantageous strength characteristics with minimal weight via a relatively simple manufacturing process that is flexible. Central to the present disclosure, the siderail members 102 substantially span the length of the subframe 100 from front to back, bridging the gap between the LLP CMS 108 (FIG. 1) and the rear ULP BIW bracket 124c and/or battery frame 110 (FIG. 1) of the vehicle. Because each of the siderail members 102 is straight (at least from a top or bottom vehicle perspective), this provides the substantially uninterrupted LLP 112 for high crash energy absorbance, from the LLP CMS 108, thru the siderail members 102, and into the rear ULP BIW bracket 124c and/or battery frame 110. Each of the siderail members 102 is substantially free from bends and/or intervening welds (at least from the top or bottom vehicle perspective) and is a straight, unitary extruded aluminum component. This provides the LLP 112 that has zero lateral offset, such that lever and torque forces are avoided in the event of a front-end (or rear-end) crash. It should be noted that any intervening welds would have less yield and the surrounding base material would include HAZs, which may be 30-50% weaker.

As illustrated, each of the siderail members 102 is coupled to the ULP BIW via the appropriate rear bracket 124c. Here, the mounts 124 used to couple components to the siderail members 102 include the engine mount shelf bracket 124a that includes the front BIW interface 124aa, the engine mount sleeve and lower wishbone bracket 124b, and the lower wishbone bracket 124c that includes the rear BIW interface 124cc, although it will be readily apparent to those of ordinary skill in the art that other components could be used equally. Any arrangement of mounts 124 can be used to support the engine/motor, suspension, and steering components, and these mounts 124 are typically coupled symmetrically to the outboard side of each of the siderail members 102. Thus, the holes/fittings for receiving and retaining these mounts 124 can readily be arranged and rearranged given the extruded aluminum body 102a of the present disclosure. Again, of note here, a front BIW interface 124aa and a rear BIW interface 124cc are provided, which the straight longitudinal siderail member 102 spans.

Figure 4:
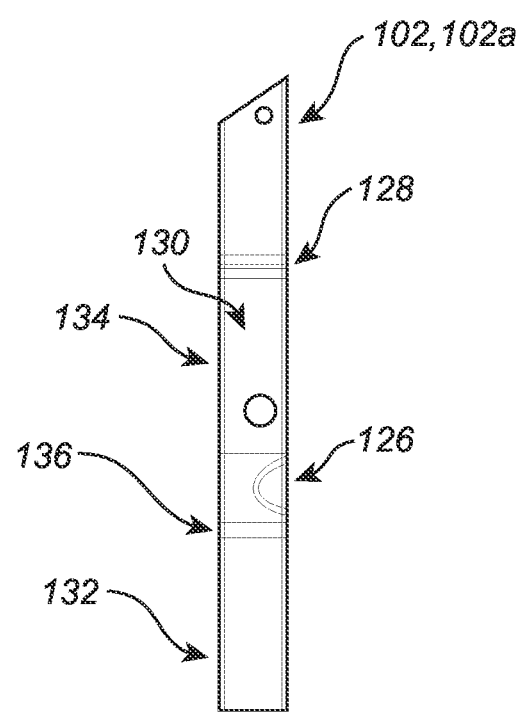
FIG. 4 is a top planar view of one illustrative embodiment of one longitudinal siderail member of the present disclosure.

FIG. 4 illustrates a right-side siderail member 102 of the present disclosure, which generally consists of a hollow aluminum extruded body 102a. This aluminum extruded body 102a is an elongate prismatic structure having a square cross-sectional shape, a rectangular cross-sectional shape, etc. A first end of the extruded body 102a includes a straight cut that is adapted to receive the coupled crashbox mounting bracket 118 (FIG. 1) and/or crashbox 116 (FIG. 1). A second end of the extruded body 102 includes an angled cut that is adapted to receive the coupled ULP BIW mounting bracket 124c (FIGS. 2 and 3) and/or battery frame 110 (FIG. 1), optionally separated by the 10-15 mm longitudinal gap described herein above. It should be noted that the bottom wall of the extruded body 102a may be made thicker than other walls to provide desired structural strength and bend performance. Likewise, the outboard wall of the extruded body 102a may be made thicker than other walls to provide desired structural strength for the attachment of outboard engine/motor mount, suspension, and steering components. The top wall 130 of the extruded body 102a may include one or more recesses 126, 128 that are adapted to promote bending at these locations, such that the overall deformation of the extruded body 102a is downward when a crash load is applied along the longitudinal axis of the extruded body 102a. In the illustrative embodiment provided, the first recess 126 laterally traverses only a portion of the top wall 130 of the extruded body 102a, providing steering component clearance, while the second recess 128 laterally traverses the whole of the top wall 130 of the extruded body 102a. These recesses 126, 128 act as deformation triggers in the event of a crash, promoting bending over cracking and/or breaking. Also, in the illustrative embodiment provided, a first portion 132 of the extruded body 102a is disposed vertically above a second portion 134 of the extruded body 102a, from a vehicle side perspective. The first portion 132 is joined with the second portion 134 by an ascending/descending intermediate portion 136. This is designed with forming operations after extrusion and the cutting of the ends to provide curbstone height in the front of the vehicle, under the subframe assembly 100 (FIGS. 1-3).

Figure 5:
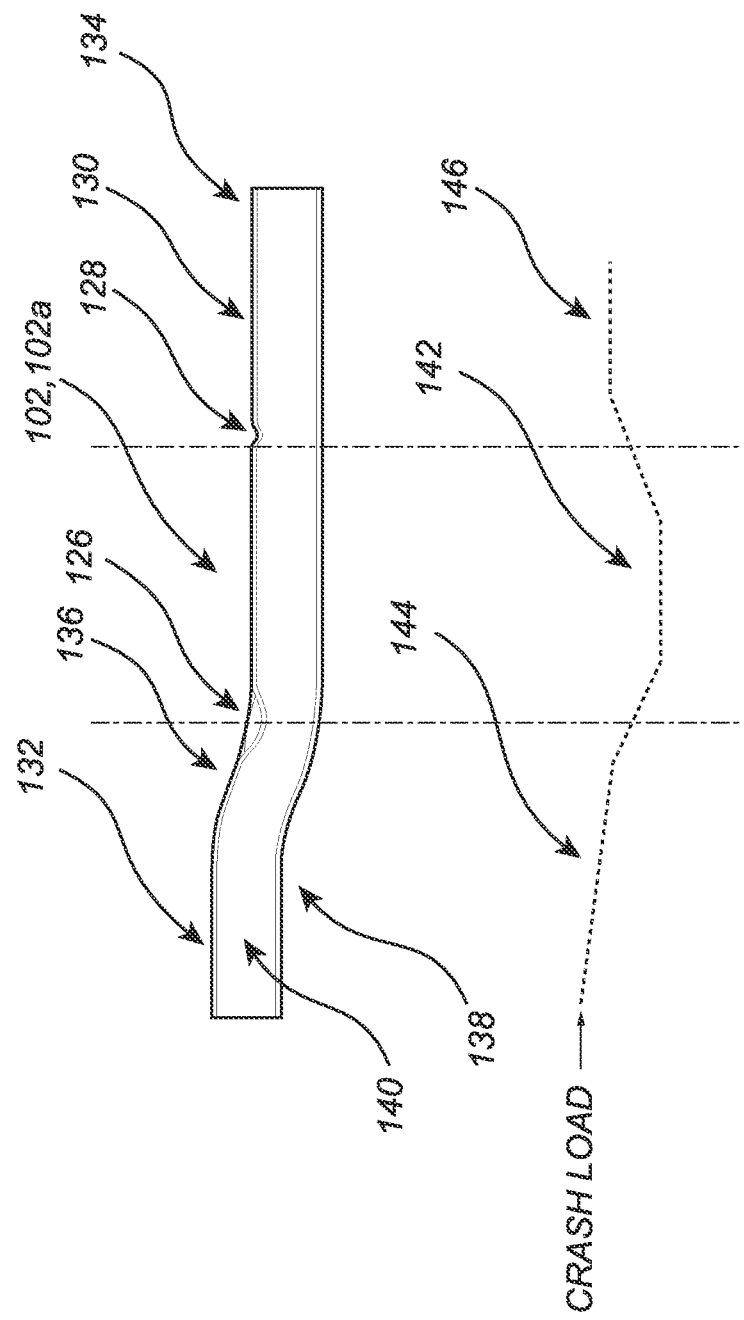
FIG. 5 is a side planar view of one illustrative embodiment of one longitudinal siderail member of the present disclosure; highlighting the associated plastic deformation of the siderail member responsive to the application of a crash load.

FIG. 5 again illustrates the right-side siderail member 102 of the present disclosure, which generally consists of the hollow aluminum extruded body 102a. Again, the bottom wall 138 of the extruded body 102a may be made thicker than other walls to provide desired structural strength and bend performance. Likewise, the outboard wall 140 of the extruded body 102a may be made thicker than other walls to provide desired structural strength for the attachment of outboard engine/motor mount, suspension, and steering components. The top wall 130 of the extruded body 102a may include the one or more recesses 126, 128 that are adapted to promote bending at these locations, such that the overall deformation of the extruded body 102a is downward when a crash load is applied along the longitudinal axis of the extruded body 102a. In the illustrative embodiment provided, the first recess 126 laterally traverses only a portion of the top wall 130 of the extruded body 102a, providing steering component clearance, while the second recess 128 laterally traverses the whole of the top wall 130 of the extruded body 102a. These recesses 126, 128 act as deformation triggers in the event of a crash, promoting bending over cracking and/or breaking. Also, in the illustrative embodiment provided, a first portion 132 of the extruded body 102a is disposed vertically above a second portion 134 of the extruded body 102a, from a vehicle side perspective. The first portion 132 is joined with the second portion 134 by an ascending/descending intermediate portion 136. This is designed with forming operations after extrusion and the cutting of the ends to provide curbstone height in the front of the vehicle, under the subframe assembly 100 (FIGS. 1-3). As is illustrated here, when deformed, the extruded body 102a preferably includes a downward deflected central portion 142 that is disposed below the higher forward portion 144 and rear portion 146.

Figure 6:
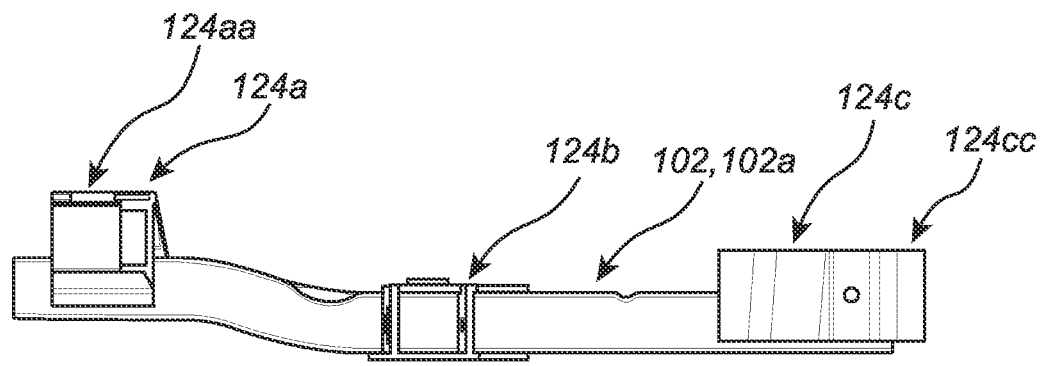
FIG. 6 is a side planar view of one illustrative embodiment of one longitudinal siderail member of the present disclosure; highlighting the coupled engine/motor mounts and suspension mounts.

FIG. 6 illustrates the attachment of the engine mount shelf bracket 124a that includes the front BIW interface 124aa, the engine mount sleeve and lower wishbone bracket 124b, and the lower wishbone bracket 124c that includes the rear BIW interface 124cc coupled to the extruded body 102a of the siderail member 102. Here, the front BIW interface 124aa and the rear BIW interface 124cc provide screw attachments of the extruded aluminum body 102a of each siderail member 102 to the ULP BIW.

Figure 7:
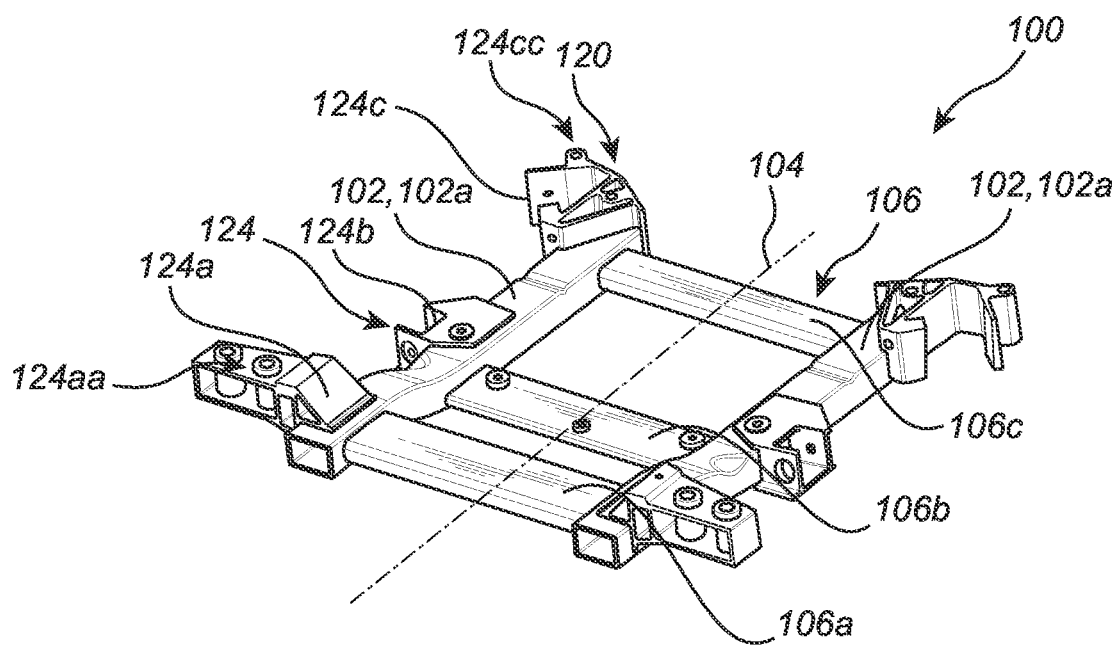
FIG. 7 is a perspective view of one illustrative embodiment of the subframe assembly and parallel, uninterrupted longitudinal siderail members of the present disclosure.

Referring now specifically to FIG. 7, from a perspective view, the subframe assembly 100 again includes the pair of straight siderail members 102 that are each disposed parallel to the longitudinal axis 104 of the subframe assembly 100 and the associated vehicle and spaced apart laterally. These siderail members 102 are coupled together via the plurality of lateral crossmembers 106 that are disposed perpendicular to the longitudinal axis 104 between the siderail members 102. Here, the crossmembers 106 include the center pole crossmember 106a, the steering gear crossmember 106b, and the rear crossmember 106c, although it will be readily apparent to those of ordinary skill in the art that other components could be used equally. Again, as is described in greater detail herein below, each of the siderail members 102 consists of a unitary, hollow aluminum extrusion, providing advantageous strength characteristics with minimal weight via a relatively simple manufacturing process that is flexible. Central to the present disclosure, the siderail members 102 substantially span the length of the subframe 100 from front to back, bridging the gap between the LLP CMS 108 (FIG. 1) and the rear ULP BIW bracket 124c and/or battery frame 110 (FIG. 1) of the vehicle. Because each of the siderail members 102 is straight (at least from a top or bottom vehicle perspective), this provides the substantially uninterrupted LLP 112 for high crash energy absorbance, from the LLP CMS 108, thru the siderail members 102, and into the rear ULP BIW bracket 124c and/or battery frame 110. Each of the siderail members 102 is substantially free from bends and/or intervening welds (at least from the top or bottom vehicle perspective) and is a straight, unitary extruded aluminum component. This provides the LLP 112 that has zero lateral offset, such that lever and torque forces are avoided in the event of a front-end (or rear-end) crash. It should be noted that any intervening welds would have less yield and the surrounding base material would include HAZs, which may be 30-50% weaker.

As illustrated, each of the siderail members 102 is coupled to the ULP BIW via the appropriate rear bracket 124c, and ultimately coupled to the battery frame 110 after optional longitudinal gap absorption in the event of a crash. Here, the mounts 124 used to couple components to the siderail members 102 include the engine mount shelf bracket 124a that includes the front BIW interface 124aa, the engine mount sleeve and lower wishbone bracket 124b, and the lower wishbone bracket 124c that includes the rear BIW interface 124cc, although it will be readily apparent to those of ordinary skill in the art that other components could be used equally. Any arrangement of mounts 124 can be used to support the engine/motor, suspension, and steering components, and these mounts 124 are typically coupled symmetrically to the outboard side of each of the siderail members 102. Thus, the holes/fittings for receiving and retaining these mounts 124 can readily be arranged and rearranged given the extruded aluminum body 102a of the present disclosure.

Figure 8:
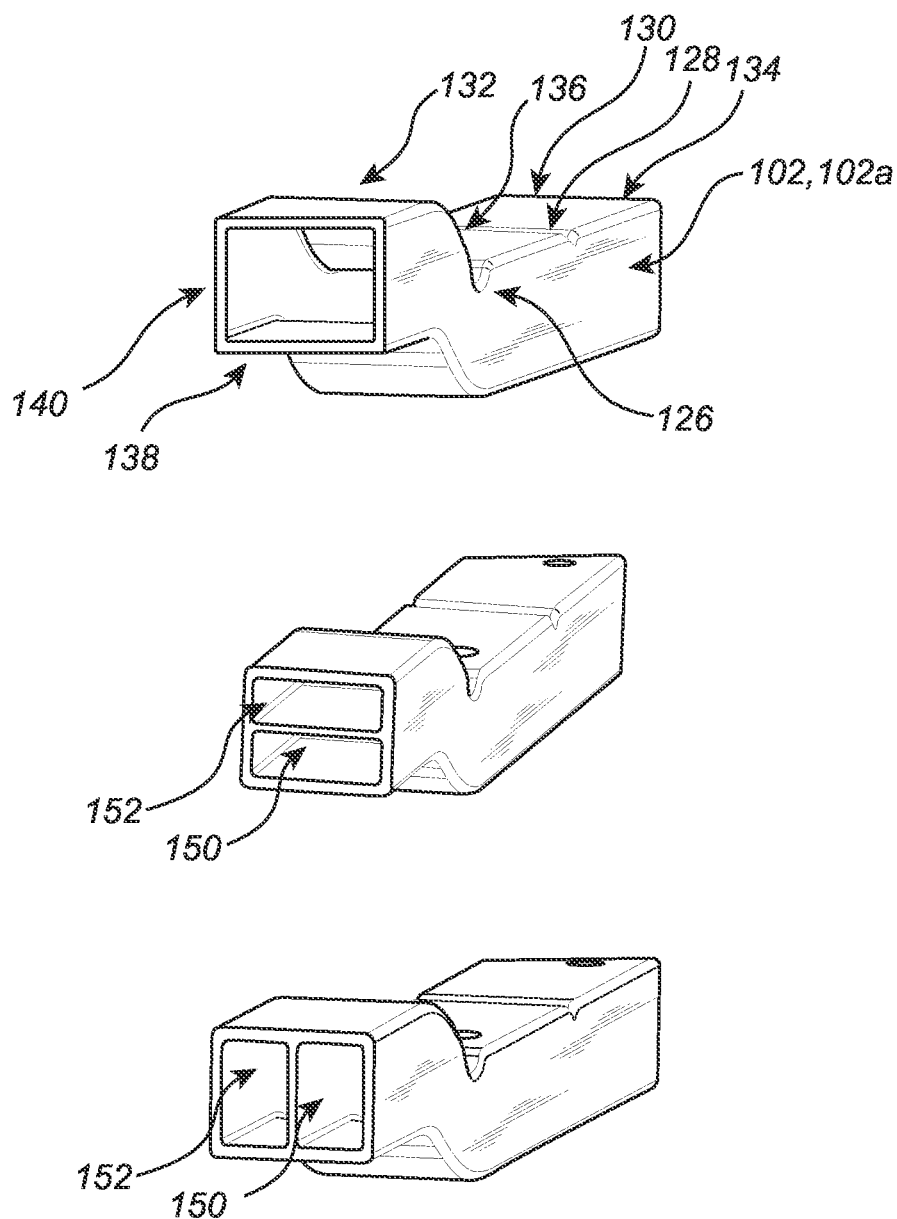
FIG. 8 is a cut perspective view of one longitudinal siderail member of the present disclosure; highlighting the potential internal walls and multi-cell configurations utilized.

FIG. 8 again illustrates the right-side siderail member 102 of the present disclosure, which generally consists of the hollow aluminum extruded body 102a. Again, the bottom wall 138 of the extruded body 102a may be made thicker than other walls to provide desired structural strength and bend performance. Likewise, the outboard wall 140 of the extruded body 102a may be made thicker than other walls to provide desired structural strength for the attachment of outboard engine/motor mount, suspension, and steering components. The top wall 130 of the extruded body 102a may include the one or more recesses 126, 128 that are adapted to promote bending at these locations, such that the overall deformation of the extruded body 102a is downward when a crash load is applied along the longitudinal axis of the extruded body 102a. In the illustrative embodiment provided, the first recess 126 laterally traverses only a portion of the top wall 130 of the extruded body 102a, providing steering component clearance, while the second recess 128 laterally traverses the whole of the top wall 130 of the extruded body 102a. These recesses 126, 128 act as deformation triggers in the event of a crash, promoting bending over cracking and/or breaking. Also, in the illustrative embodiment provided, a first portion 132 of the extruded body 102a is disposed vertically above a second portion 134 of the extruded body 102a, from a vehicle side perspective. The first portion 132 is joined with the second portion 134 by an ascending/descending intermediate portion 136. This is designed with forming operations after extrusion and the cutting of the ends to provide curbstone height in the front of the vehicle, under the subframe assembly 100 (FIGS. 1-3 and 7).

Here, it can be seen that the extruded body 102a may include one or more horizontal or vertical internal walls 150 that divide the interior of the extruded body into a plurality of cells 152. These internal walls 150 enhance the strength and structural integrity of the extruded body 102a, enhancing plastic deformation behavior.

Figure 9:
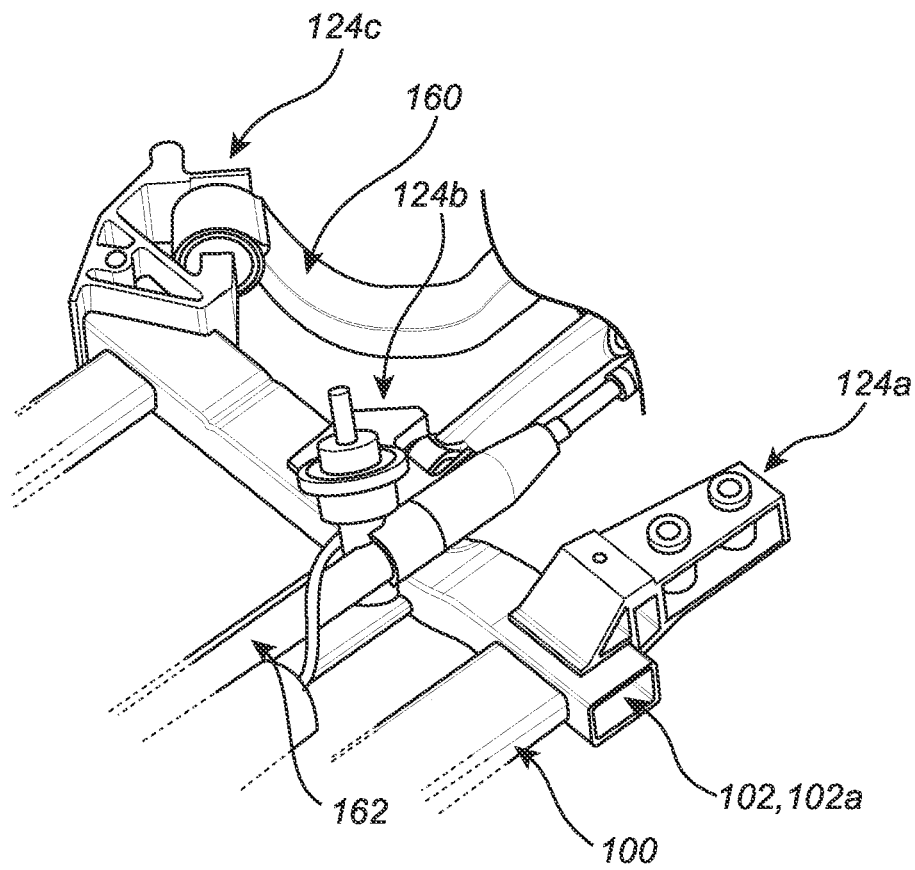
FIG. 9 is a partial perspective view of one illustrative embodiment of the subframe assembly and parallel, uninterrupted longitudinal siderail members of the present disclosure, highlighting the coupled engine/motor mounts, suspension mounts and components, and steering components.

FIG. 9 illustrates the attachment of the engine mount shelf bracket 124a that includes the front BIW interface, the engine mount sleeve and lower wishbone bracket 124b, and the lower wishbone bracket 124c that includes the rear BIW interface coupled to the extruded body 102a of the siderail member 102, as well as the associated 4 link suspension 160 and steering gear crossmember 162, as illustrative coupled components.

In view of the above, the present disclosure also provides a method for manufacturing a vehicle. This method includes: providing a subframe assembly adapted to absorb crash energy, wherein the subframe assembly includes a pair of parallel siderail members, wherein each of the pair of parallel siderail members is straight from a top or bottom vehicle perspective and spans a distance between a lower load path crash management system of the vehicle and an upper load path/battery frame of the vehicle in a substantially uninterrupted manner; coupling a first end of each of the pair of parallel siderail members to the lower load path crash management system; and coupling a second end of each of the pair of parallel siderail members to the upper load path/battery frame. Each of the pair of parallel siderail members defines a straight, substantially uninterrupted lower load path from the top or bottom vehicle perspective that is parallel to a longitudinal axis of the vehicle between the lower load path crash management system and the upper load path/battery frame. Coupling the first end of each of the pair of parallel siderail members to the lower load path crash management system includes coupling the first end of each of the pair of parallel siderail members to an associated longitudinally coaxially aligned crashbox of the lower load path crash management system. Optionally, coupling the second end of each of the pair of parallel siderail members to the upper load path/battery frame includes coupling the second end of each of the pair of parallel siderail members to a rear upper load path body in white bracket with the second end of each of the pair or parallel siderail members spaced apart from the battery frame by a small gap.

Figure 10:
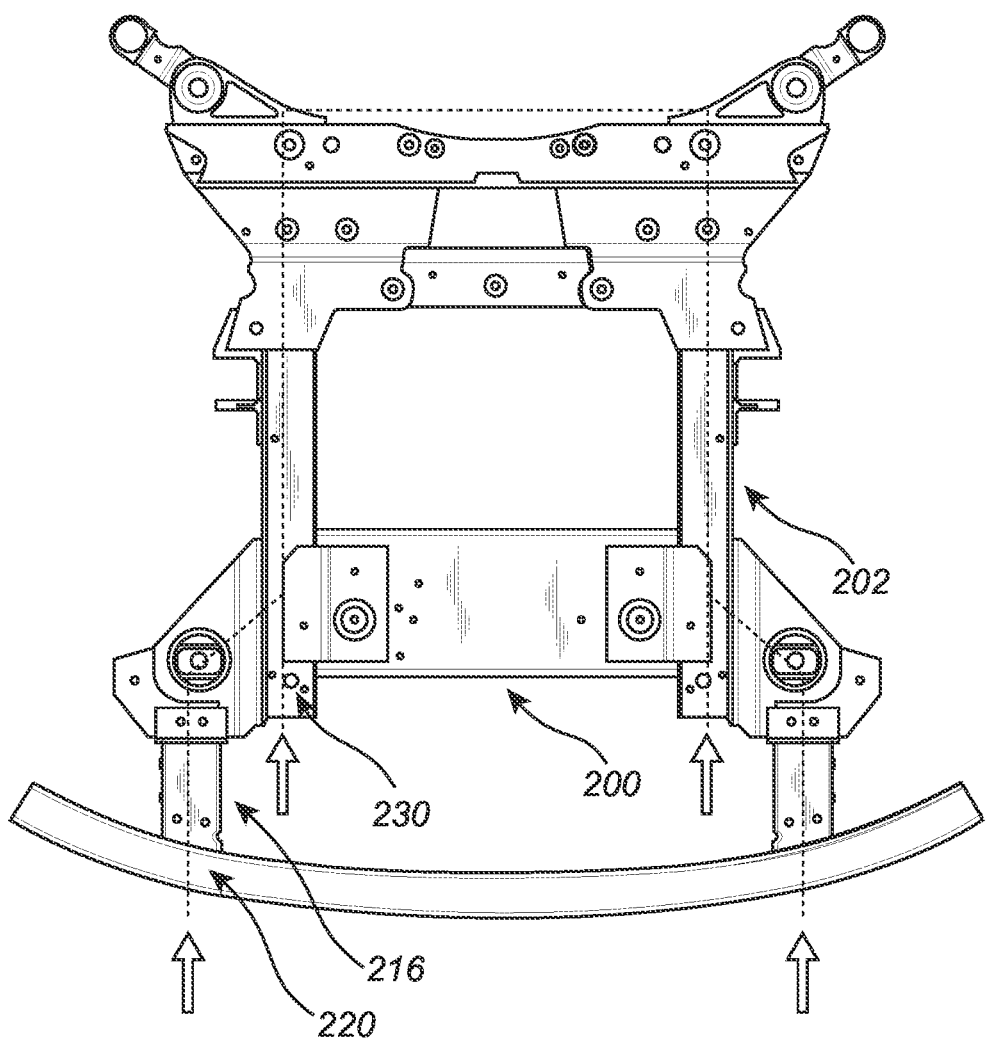
FIG. 10 is a top planar view of a conventional subframe assembly and parallel longitudinal siderail members, highlighting the offset axial alignment of the siderail members and the associated crashboxes.

To illustrate the advantages of the present disclosure, FIG. 10 illustrates a conventional subframe 200 and siderails 202, where the load path 220 through the crashbox 216 is not coaxially aligned with the load path 230 through the siderail 202. This results in some levering of the load path 230 in the event of a crash, which decreases the amount of crash energy that may be absorbed without occupant cabin intrusion.

Figure 11:
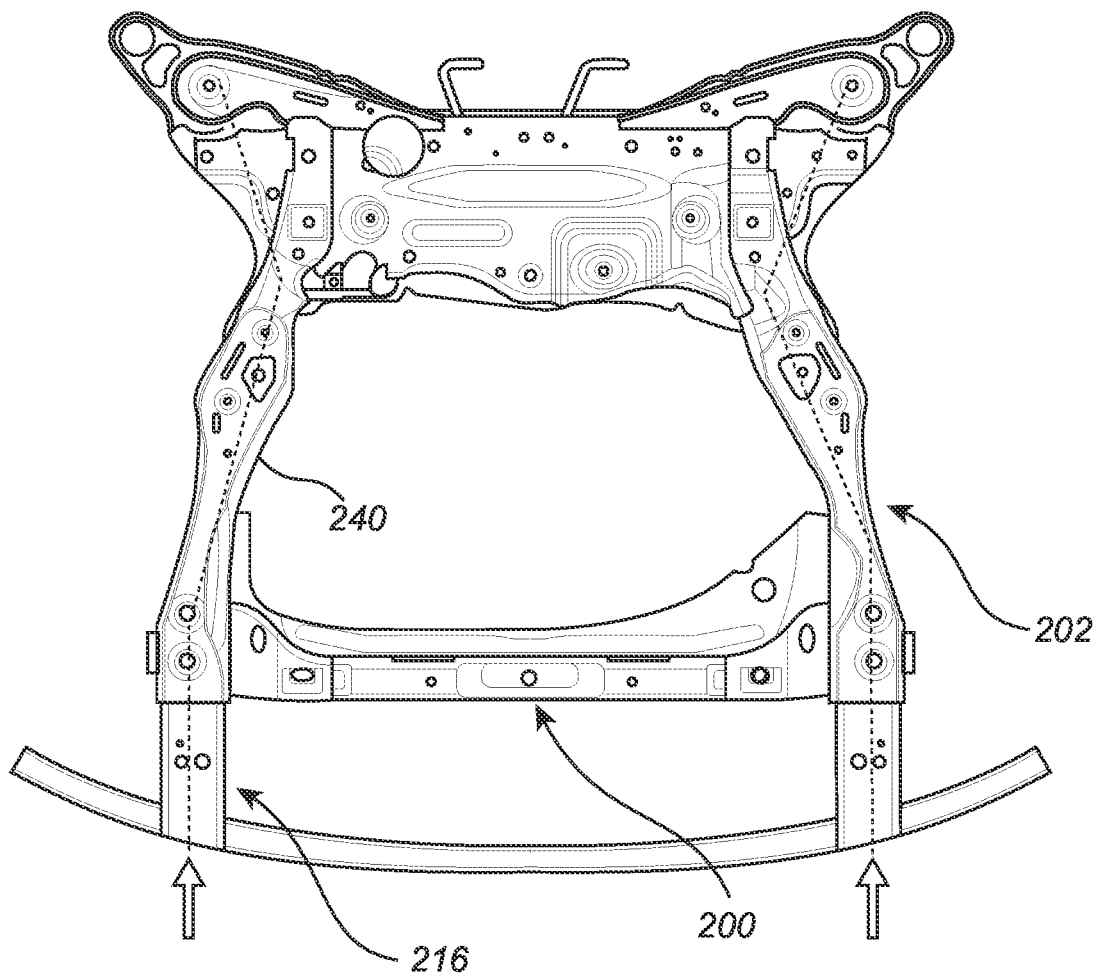
FIG. 11 is a top planar view of another conventional subframe assembly and non-parallel, interrupted siderail members.

To further illustrate the advantages of the present disclosure, FIG. 11 again illustrates a conventional subframe 200 and siderails 202, where the load path 240 through the crashbox 216 is coaxially aligned with the load path 240 through the siderail 202 initially, but where the load path 240 is not straight and uninterrupted, the siderail 202 being composed of multiple pieces that are welded together, forming load path angles. This again results in some levering of the load path 240 in the event of a crash, which decreases the amount of crash energy that may be absorbed without occupant cabin intrusion.

Figure 12:
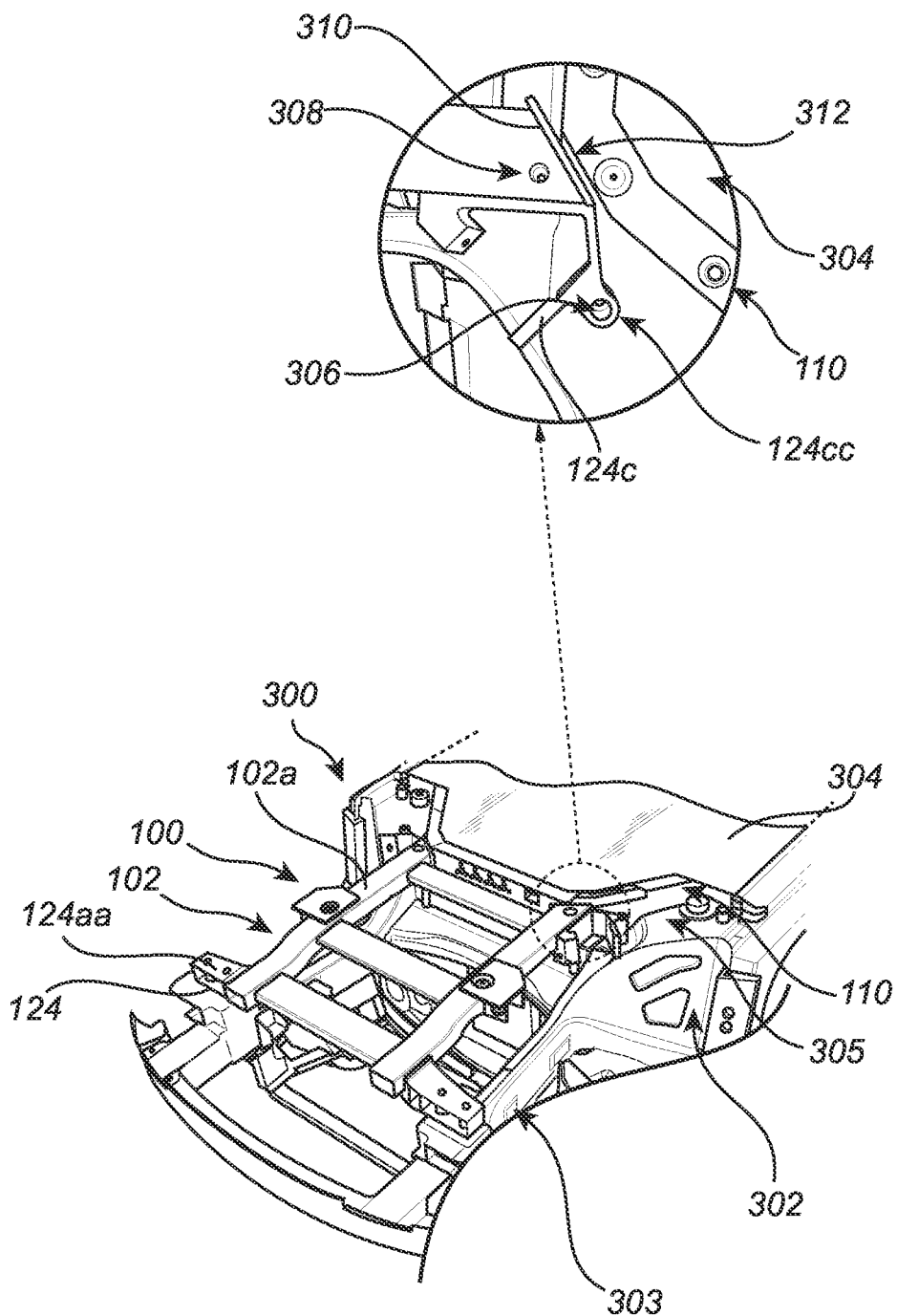
FIG. 12 is a pair of perspective views illustrating the connection of the siderail members of the subframe assembly of the present disclosure to the ULP BIW of the associated vehicle, and the gapped coupling of the siderail members of the subframe assembly to the battery frame of the associated vehicle.

FIG. 12 is a pair of perspective views illustrating the connection of the siderail members 102 of the subframe assembly 100 of the present disclosure to the ULP BIW 302 of the associated vehicle 300, and the gapped coupling of the siderail members 102 of the subframe assembly 100 to the battery frame 110 of the associated vehicle 300. Here, it can be seen that the engine mount shelf bracket 124a includes the front BIW interface 124aa and the lower wishbone bracket 124c includes the rear BIW interface 124cc. The front BIW interface 124aa and the rear BIW interface 124cc provide screw attachments for coupling the extruded aluminum body 102a of each siderail member 102 to the ULP BIW 302. The battery tray 304 is generally disposed behind the battery frame 110.

As illustrated, the front BIW interface 124aa includes a pair of screw holes through which vertical screws are disposed to secure each engine mount shelf bracket 124a and siderail member 102 to a front portion 303 of the ULP BIW 302. The rear BIW interface 124cc includes a screw hole 306 through which a vertical screw is disposed to secure each lower wishbone bracket 124c and siderail member 102 to a rear portion 305 of the ULP BIW 302. A screw hole 308 may also be provided through each aluminum extruded body 102a itself through which a vertical screw is disposed to further secure each siderail member 102 to the rear portion 305 of the ULP BIW 302. Here, an angled end plate 310 is provided on the end of each of the siderail members 102 and a small longitudinal gap 312 of 10-15 mm or so is left between the end of the siderail member 102 and the battery frame 110 itself. This small longitudinal gap 312 is rapidly absorbed in a crash (in a few milliseconds) and allows either the subframe 100 and/or the battery frame 110 to be removed independently when necessary. This small longitudinal gap 312 forms the "substantially uninterrupted" coupling of the siderail member 102 and the battery frame 110 adjacent to the lower wishbone bracket 124c and the rear BIW interface 124cc. The end plate 310 may be a separate component from or integrally formed with the lower wishbone bracket 124c and rear BIW interface 124cc.

Figure 13:
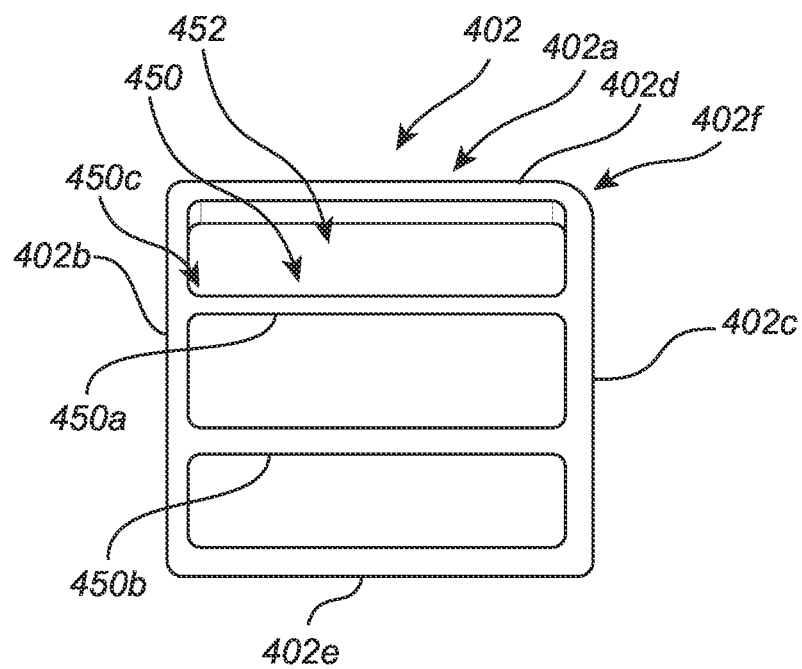
FIG. 13 is a cross-sectional end view of one illustrative embodiment of the extruded scaleable multi-cell siderail member of the present disclosure, highlighting the internal walls and thickness variations utilized.

FIG. 13 is a cross-sectional end view of one illustrative embodiment of the extruded scaleable multi-cell siderail member 402 that is used with the subframe assembly 100 (FIGS. 1-3, 7, 9, and 12) of the present disclosure or the like. The siderail member 402 includes a hollow elongate body 402a that is disposed about a longitudinal axis. The siderail member 402 is preferably manufactured from extruded aluminum or the like, imparting the siderail member 402 with advantageous rigidity and ductility, while maintaining manufacturing ease and scaleability/reconfigurability. The right-side siderail member 402 illustrated includes an inboard wall 402b, an outboard wall 402c, a top wall 402d, and a bottom wall 402e. These exterior walls 402b, 402c, 402d, and 402e may be joined at the corners of the elongate body 402a at one or more internal and/or external radii 402f. Sharp internal and/or external corners may also be utilized. Although any external wall thicknesses may be utilized (illustrative dimensions are provided), as illustrated, the bottom wall 402e may have a greater thickness than the top wall 402d to promote downward bending in the event of a longitudinal crash force with ductility and without cracking or fracture in the bottom wall 402e, for example. The outboard wall 402c may have a greater thickness than the inboard wall 402b to provide strength for outboard component attachment, for example. These thickness relationships are scaleable based on subframe load and vehicle requirements. It should be note that, although the right-side siderail member 402 is illustrated and described herein, the same principles apply equally to the left-side siderail member 402. Preferably, the siderail member 402 includes one or more internal walls 450 that divide the interior of the siderail member 402 into a plurality of internal cells 452. In the illustrative embodiment shown, a horizontal top internal wall 450a and a horizontal bottom internal wall 450b are provided, dividing the interior of the siderail member 402 into three horizontally-oriented internal cells 452. It will be readily apparent to those of ordinary skill in the art that fewer or more internal walls 450 and cells 452 can be used equally, and that these internal walls 450 and cells 452 can be horizontal and/or vertical. The bottom internal wall 450b may have a greater thickness than the top internal wall 450a to further promote downward bending in the event of a longitudinal crash force with ductility and without cracking or fracture in the bottom wall 402e and bottom internal wall 450b, for example. Again, these internal wall thickness variations can be horizontal and/or vertical, depending on what type of internal walls 450 are used. The internal walls 450 may be joined with the exterior walls 402b, 402c, 402d, and 402e at one or more top and/or bottom or left and/or right radii 450c. It will be readily apparent to those of ordinary skill in the art that the configuration of the siderail member 402 of the present disclosure may be utilized in other subframe members as well, such as longitudinal center members, lateral spanning members, etc., all of which may be manufactured from extruded aluminum in a similar manner.

Figure 14:
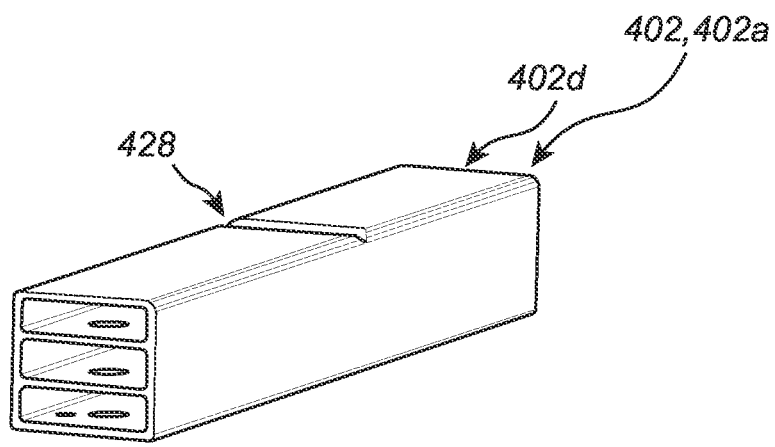
FIG. 14 is a perspective view of one illustrative embodiment of the extruded scaleable multi-cell siderail member of the present disclosure, highlighting the internal walls, thickness variations, and flexure recess utilized.

FIG. 14 is a perspective view of one illustrative embodiment of the extruded scaleable multi-cell siderail member 402 of the present disclosure, highlighting the flexure recess 428 utilized. This flexure recess 428, manufactured into the top wall 402d of the elongate body 402a, is adapted to promote bending at this location, such that the overall deformation of the elongate body 402a is downward when a crash load is applied along the longitudinal axis of the elongate body 402a. Multiple such flexure recesses 428 can be used along the length of the elongate body 402a.

Figure 15:
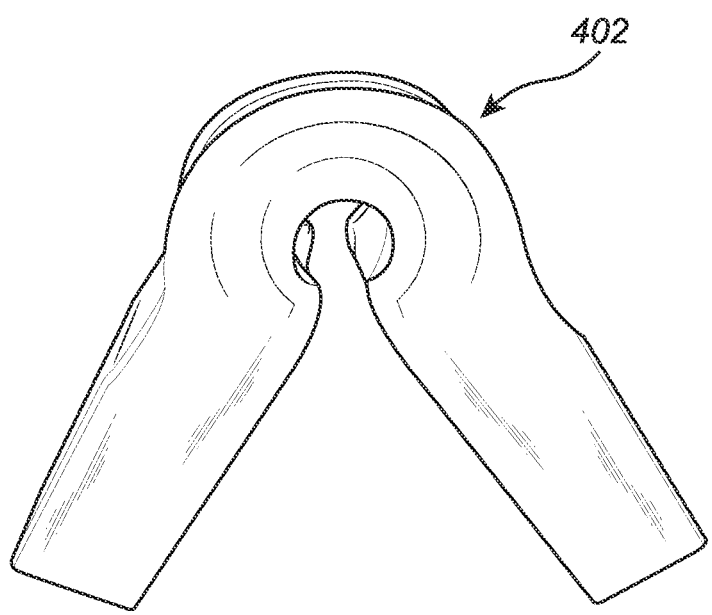
FIG. 15 is a perspective view of one illustrative embodiment of the extruded scaleable multi-cell siderail member of the present disclosure in a deformed state, highlighting the associated ductility without cracking or fracture.

FIG. 15 is a perspective view of one illustrative embodiment of the extruded scaleable multi-cell siderail member 402 of the present disclosure in a deformed state, highlighting the associated ductility without cracking or fracture. The multi-cell siderail members of the present disclosure provide rigidity, high yield, and ductility and can absorb large amounts of crash energy without rupturing and detaching from the associated vehicle. The siderail members are not as brittle as castings or heavy as steel structures. The thickness of all walls can be scaled up or down, depending on vehicle weight and specifications, and can meet intrusion and pulse requirements in every vehicle. In a crash, the siderail members plastically deform, crumple, bend down, and absorb energy, avoiding stackup and thereby achieving low pulls and low intrusion for vehicle occupants. This low intrusion also benefits batteries disposed adjacent to and behind the subframe.

In view of the above, the present disclosure also provides a method for manufacturing a siderail member for a subframe assembly of a vehicle, the method including: extruding an elongate body, wherein the elongate body includes a hollow structure including an inboard wall, an outboard wall, a top wall, a bottom wall, and one or more internal walls, and wherein the hollow structure is manufactured from an aluminum material. Optionally, the bottom wall has a thickness that is greater than a thickness of the top wall and the outboard wall has a thickness that is greater than a thickness of the inboard wall. Optionally, the one or more internal walls include a top internal wall and a bottom internal wall forming a plurality of horizontally-disposed cells within an interior of the elongate body, and the bottom internal wall has a thickness that is greater than a thickness of the top internal wall.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A subframe assembly for a vehicle, the subframe assembly comprising:
a siderail member comprising an elongate body, wherein the elongate body comprises a hollow extruded structure comprising an inboard wall, an outboard wall, a top wall, a bottom wall, and one or more internal walls, wherein the elongate body is adapted to receive a plurality of mounts on an outboard side thereof for direct mounting of any of engine/motor, suspension, or steering components of the vehicle to the elongate body, and wherein the elongate body provides a lower load path that is straight from a top/bottom perspective and spans a gap between a lower load path crash management system of the vehicle disposed at one end thereof and one or more of the following disposed at another end thereof: an upper load path body in white coupling and a battery frame of the vehicle.

2. The subframe assembly of claim 1, wherein the bottom wall has a thickness that is greater than a thickness of the top wall.

3. The subframe assembly of claim 1, wherein the outboard wall has a thickness that is greater than a thickness of the inboard wall.

4. The subframe assembly of claim 1, wherein the one or more internal walls comprise one or more horizontally-disposed internal walls that span a distance between the inboard wall and the outboard wall forming a plurality of horizontally-disposed hollow cells within an interior of the elongate body.

5. The subframe assembly of claim 1, wherein the one or more internal walls comprise one or more vertically-disposed internal walls that span a distance between the bottom wall and the top wall forming a plurality of vertically-disposed hollow cells within an interior of the elongate body.

6. The subframe assembly of claim 1, wherein the one or more internal walls comprise a top internal wall and a bottom internal wall forming a plurality of horizontally-disposed cells within an interior of the elongate body.

7. The subframe assembly of claim 6, wherein the bottom internal wall has a thickness that is greater than a thickness of the top internal wall.

8. The subframe assembly of claim 1, wherein the hollow extruded structure is manufactured from an aluminum material.

9. The subframe assembly of claim 1, wherein the top wall of the hollow extruded structure defines a flexure recess.

10. A siderail member for a subframe assembly of a vehicle, the siderail member comprising:
an elongate body, wherein the elongate body comprises a hollow extruded structure comprising an inboard wall, an outboard wall, a top wall, a bottom wall, and one or more internal walls, wherein the elongate body is adapted to receive a plurality of mounts on an outboard side thereof for direct mounting of any of engine/motor, suspension, or steering components of the vehicle to the elongate body, and wherein the elongate body provides a lower load path that is straight from a top/bottom perspective and spans a gap between a lower load path crash management system of the vehicle disposed at one end thereof and one or more of the following disposed at another end thereof: an upper load path body in white coupling and a battery frame of the vehicle.

11. The siderail member of claim 10, wherein the bottom wall has a thickness that is greater than a thickness of the top wall.

12. The siderail member of claim 10, wherein the outboard wall has a thickness that is greater than a thickness of the inboard wall.

13. The siderail member of claim 10, wherein the one or more internal walls comprise one or more horizontally-disposed internal walls that span a distance between the inboard wall and the outboard wall forming a plurality of horizontally-disposed hollow cells within an interior of the elongate body.

14. The siderail member of claim 10, wherein the one or more internal walls comprise one or more vertically-disposed internal walls that span a distance between the bottom wall and the top wall forming a plurality of vertically-disposed hollow cells within an interior of the elongate body.

15. The siderail member of claim 10, wherein the one or more internal walls comprise a top internal wall and a bottom internal wall forming a plurality of horizontally-disposed cells within an interior of the elongate body.

16. The siderail member of claim 15, wherein the bottom internal wall has a thickness that is greater than a thickness of the top internal wall.

17. The siderail member of claim 10, wherein the hollow extruded structure is manufactured from an aluminum material.

18. The siderail member of claim 10, wherein the top wall of the hollow extruded structure defines a flexure recess.

19. A method for manufacturing a siderail member for a subframe assembly of a vehicle, the method comprising:
extruding an elongate body, wherein the elongate body comprises a hollow structure comprising an inboard wall, an outboard wall, a top wall, a bottom wall, and one or more internal walls, and wherein the hollow structure is manufactured from an aluminum material, wherein the elongate body is adapted to receive a plurality of mounts on an outboard side thereof for direct mounting of any of engine/motor, suspension, or steering components of the vehicle to the elongate body, and wherein the elongate body provides a lower load path that is straight from a top/bottom perspective and spans a gap between a lower load path crash management system of the vehicle disposed at one end thereof and one or more of the following disposed at another end thereof: an upper load path body in white coupling and a battery frame of the vehicle.

20. The method of claim 19, wherein the bottom wall has a thickness that is greater than a thickness of the top wall and wherein the outboard wall has a thickness that is greater than a thickness of the inboard wall.

21. The method of claim 19, wherein the one or more internal walls comprise a top internal wall and a bottom internal wall forming a plurality of horizontally-disposed cells within an interior of the elongate body, and wherein the bottom internal wall has a thickness that is greater than a thickness of the top internal wall.

\* \* \* \* \*